(No Model.) 2 Sheets—Sheet 1.
W. S. SCOTT.
AUTOMATIC GRAIN WEIGHER AND REGISTER.
No. 399,164. Patented Mar. 5, 1889.
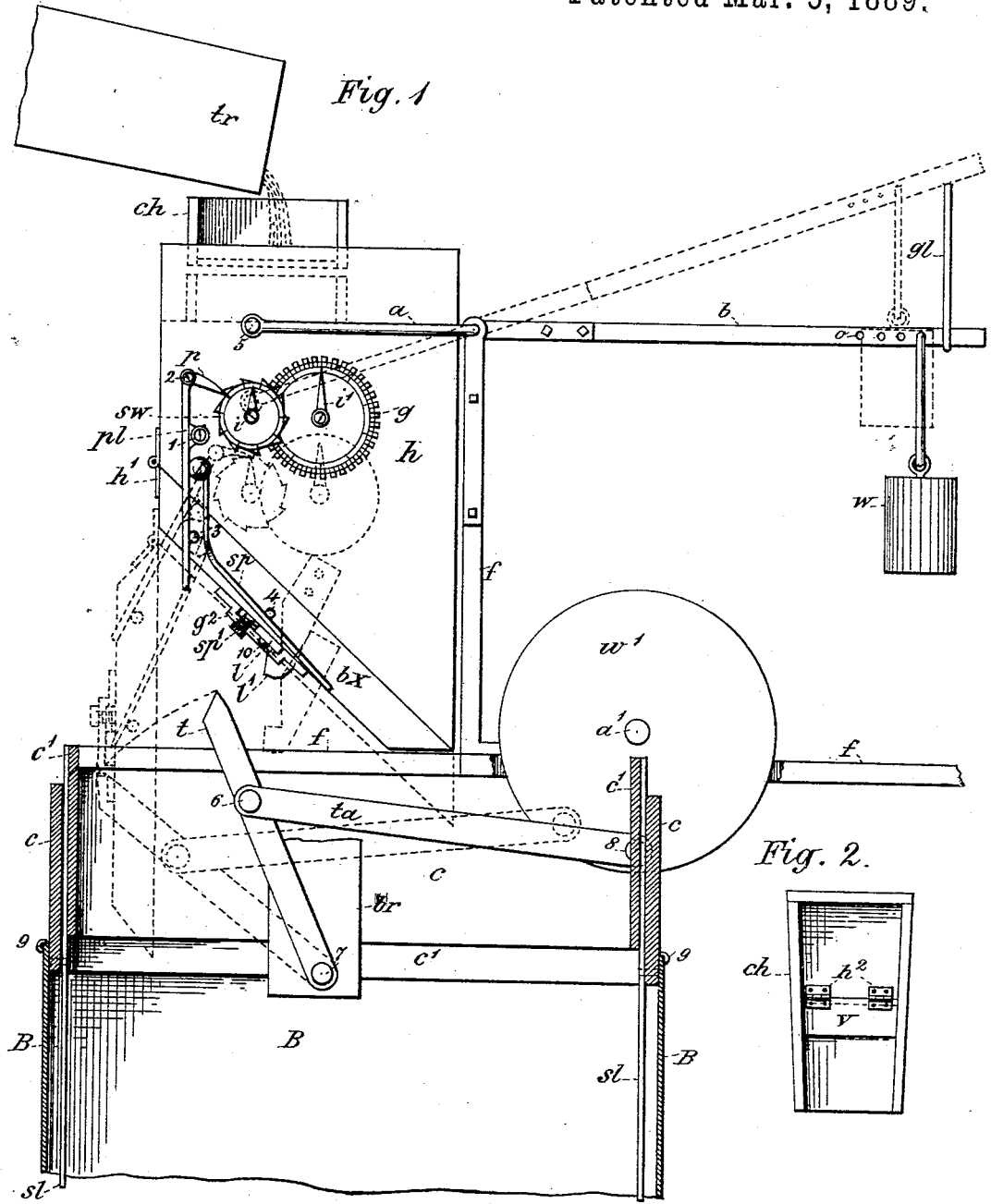
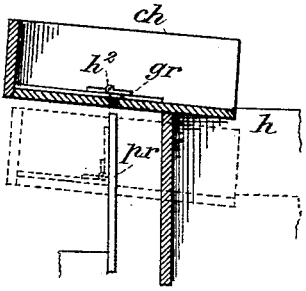
WITNESSES,
Gustav Bohn
E. B. Griffith
INVENTOR.
Wm. S. Scott.
By C. P. Jacobs
Atty.

(No Model.) 2 Sheets—Sheet 2.

W. S. SCOTT.
AUTOMATIC GRAIN WEIGHER AND REGISTER.

No. 399,164. Patented Mar. 5, 1889.

WITNESSES,
Gustav Bohn
E. B. Griffith

INVENTOR.
Wm. S. Scott.
By C. P. Jacobs
Atty.

UNITED STATES PATENT OFFICE.

WILLIAM S. SCOTT, OF EMINENCE, INDIANA.

AUTOMATIC GRAIN WEIGHER AND REGISTER.

SPECIFICATION forming part of Letters Patent No. 399,164, dated March 5, 1889.

Application filed February 13, 1888. Serial No. 263,930. (No model.)

*To all whom it may concern:*

Be it known that I, WILLIAM S. SCOTT, of Eminence, county of Morgan, and State of Indiana, have invented certain new and useful Improvements in Automatic Grain Measurers and Weighers; and I do hereby declare that the following is a full, clear, and exact description thereof, reference being had to the accompanying drawings, in which like letters refer to like parts.

My invention relates to the construction of devices for weighing and measuring grain automatically, and will be understood from the following description.

Figure 4:
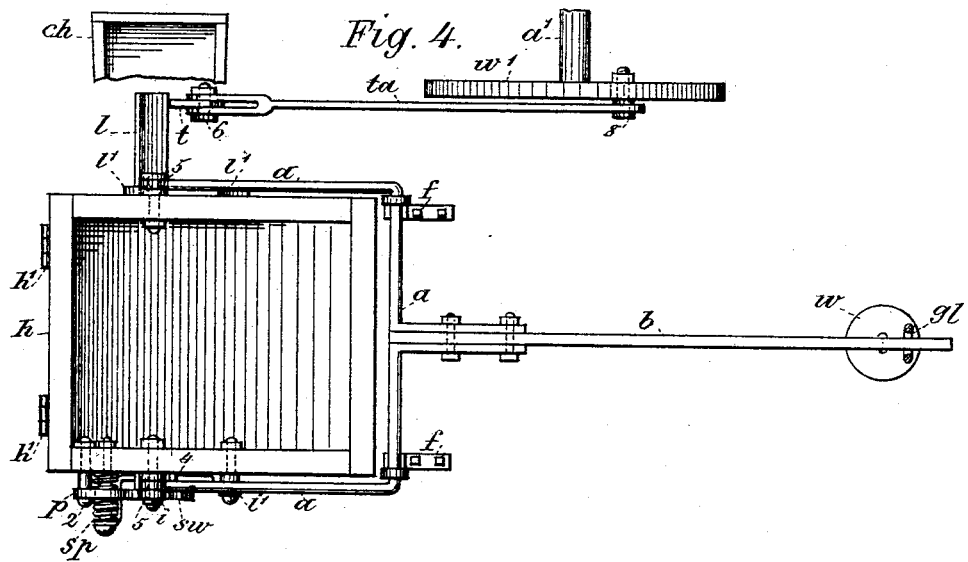
Figure 5:
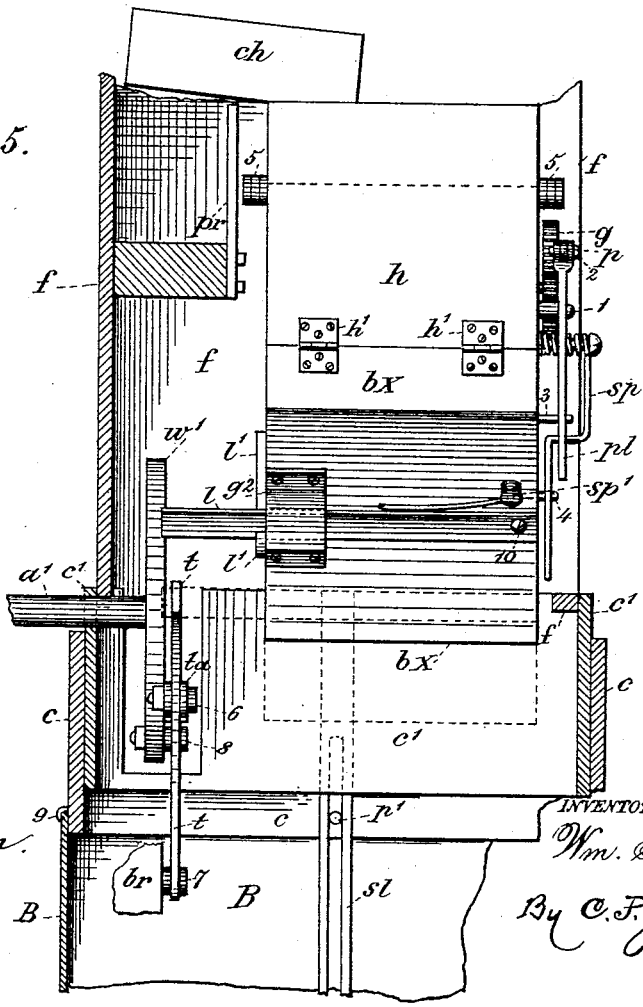

In the drawings, Figure 1 represents a side view of my device, the bag and the frame to which it is attached being in section. Fig. 2 is a top view of the chute, showing the hinge-valve. Fig. 3 is a longitudinal section of the chute, showing its relation to the hopper. Fig. 4 is a top view of Fig. 1. Fig. 5 is a rear end view of the same.

In detail the device consists of a framework, $f$, which supports the entire mechanism. This frame provides bearings for the axle $a'$ of the driving-wheel $w'$, which has a wrist-pin, 8, carrying a trip-arm, $ta$, pivoted at 6 to the trip $t$, the latter being pivoted at 7 to the brace $br$, connected with the frame.

$b$ is a scale-beam having holes $o$ to receive a hook connected with the weight $w$ for weighing the grain. This beam moves in a guide-loop, $gl$, connected from above.

$a$ is a bail pivoted on each side at 5 to the hopper $h$. This bail passes through eyes in the uprights of the frame, as shown in Fig. 4. Upon these bearings the hopper is carried.

$tr$ is a trough leading from the machine through which the grain passes into the chute $ch$. This chute has a valve, $v$, in its bottom, the valve being hinged at $h^2$, as shown in Fig. 2. This valve is intended to be operated by a projection, $pr$, which is bolted to the cross-beam of the frame, as shown in Fig. 5, so that when the hopper falls this projection passes upward, striking the valve and raising it in a position practically parallel with the end of the chute, thus preventing the grain from falling into the hopper and holding it in the chute until the hopper is again lifted, as hereinafter described.

The hopper is provided with a bottom piece, $bx$, hinged to the hopper at $h'$ by a flat hinge, and this bottom is locked by a latch-bar, $l$, locking into the latch $l'$, which latter is fastened to the sides of the hopper, as shown in the dotted lines in Fig. 1.

$sp$ is a wire spring wound at one end around a pin and at the other and free end bearing against a pin, 4, in the sides of the bottom piece, the tendency of this spring being to press the bottom piece up toward the hopper when the pressure of the weight of grain ceases.

$sp'$ is a similar spring coiled about a pin at one end, its other and free end pressing upon the edge of the latch $l$, so as to force it down into engagement with the latch-hook $l'$, as shown in Fig. 5.

$g^2$ is a guide in which the latch $l$ moves, serving to keep it in position.

The weight $w$ being set at the required point corresponding to the capacity of the hopper, the wheat is fed through the trough $tr$ to the chute $ch$, falling down into the hopper $h$. When this is filled, so that the weight of the wheat will overcome that of the weight $w$, the hopper will drop downward, its position at that time being indicated by the dotted lines in Fig. 1. The wheel $w'$ is in constant motion, and when the hopper drops the trip $t$, operated by the wheel and its connecting-arm $ta$, will strike the latch $l$, push it out, freeing it from engagement with the hook $l'$, the bottom piece, $bx$, will drop, and the wheat will be discharged through the opening in the lower casing, $c'$, into the bag B below. At the same time, the chute falling with the hopper, the projection $pr$ will strike the hinge-valve $v$, push it into a vertical position, stop the discharge into the hopper, and detain the wheat in the chute until the hopper is emptied. When this takes place, the weight will exert its force to lift the hopper, and as it rises the spring $sp$ will operate to close the bottom piece against the hopper, the latch will engage with the hook, and the hopper be closed. The movement of the trip operated by the wheel $w'$ will not affect this, as the hopper will rise high enough so that the end of the trip $t$ will not engage with the latch until the hopper falls again. As the hopper rises it lifts the chute, the valve $v$ drops down upon the bottom of the latter, and the grain again pours from the trough into the hopper, and so the operation is repeated as long as may be desired.

The sack or bag B is fastened to pins or hooks 9 upon the sides of the casing c, which is preferably made in two parts—an outer and an inner one. The latter (which is represented at c') has a slide or tongue formed on its sides, which moves in grooves formed on the inside of the outer casing, the object of this being to regulate the height of the bag as may be desired. This casing may be made solid instead of in two parts, and I do not intend to limit myself to either form of construction. My machine therefore operates automatically, as will be seen, to drop the hopper when the weight of the grain is greater than that of the weight upon the beam, to discharge the grain into the proper receptacle by means of the trip operated by a wheel to which power is applied, and again to stop the flow of wheat into the hopper by means of a valve in the chute controlled by a projection or plate fastened inside the frame-work in proper position, and to again raise the hopper and close the valve, so that the latter will be ready for another supply of grain.

It only remains now to describe my registering apparatus. This is shown in Fig. 1, and consists of a small ratchet-wheel, sw, pivoted at one side of the hopper, its pivot carrying an index, i. This spur-wheel has an offset, which is geared with the teeth of the larger gear-wheel, g, also carried upon a pivot connected to the hopper and having a central index, i'. The movement of the ratchet-wheel operates the larger gear-wheel, and their teeth are proportioned, preferably, in the ratio of one to ten, or ten to one hundred. Thus, for instance, each tooth upon the ratchet-wheel will indicate one bushel, and if it has ten teeth the revolution of this wheel will operate to mark ten bushels upon the larger wheel, though the proportions may be made in any manner desired.

The ratchet-wheel is actuated by a pawl, p, pivoted at 2 at the end of the pawl-lever pl, which is pivoted at 1 to the side of the hopper, and the end of this lever bears against a pin fixed to the bottom piece of the hopper. Then as the hopper drops and the trip releases the latch the bottom piece of course will fall, and as it falls will press the lower end of the pawl-lever to the left and the pawl to the right and against one of the ratchet-teeth, moving it upward one notch. Thus every load discharged from the hopper registers one notch upon the ratchet-wheel and the ratchet-wheel in completing a revolution will mark a corresponding amount upon the larger gear-wheel, g, and this being on the outside of the hopper may be easily read off and noted. The indexes, being movable, may be set back to the beginning when one job is finished. The scale-beam b is directly connected to the bail of the hopper, as shown in Fig. 4.

It will be seen that in my machine the sack is carried upon a frame-work in line with the hopper and directly below its mouth, so that the grain is measured directly into the bag, thereby saving the labor of at least two men, inasmuch as one man can attach, remove, and tie the bags and with greater ease than three men commonly do it. Again, by running the grain directly from the hopper into the sack a considerable amount of grain commonly lost upon the ground is saved to the farmer.

What I claim as my invention, and desire to secure by Letters Patent, is the following:

1. In an automatic grain weighing and measuring machine, a frame-work, a hopper suspended therefrom, a scale-beam connected to the hopper and carrying a weight, a bottom hinged to such hopper, a spring connected thereto for closing and a latch for securing the same, and a trip for unlatching connected to a wheel driven by suitable power, such trip operating to release the latch when the loaded hopper falls, all combined substantially as shown and described.

2. A grain-weighing machine comprising a hopper having a hinged bottom suspended by a bail from a frame, a scale-beam connected to the hopper-bail, and a chute connected above the hopper, having a valve in its bottom adapted to be lifted when the chute falls by contact with a projection, whereby the grain is held in the chute and prevented from falling into the hopper until the latter rises, substantially as described.

3. A grain-weighing machine comprising, in combination, a frame-work, a hopper having a hinged bottom, a bail connected to such hopper suspended in such frame-work, an axle journaled in such frame, a driving-wheel mounted thereon, a tripping mechanism connected to such driving-wheel at one end and at the other, and a trip which engages with a latch secured to the hinged bottom of such hopper, whereby the latch is freed by the descent of the load, substantially as shown and described.

4. A grain-weighing machine comprising a hopper suspended by its bail from the frame and carrying above it a chute provided with a valve located in line and in combination with a projection from the frame, whereby the descent of the loaded hopper closes the valve and retains the grain in the chute until the hopper again rises, substantially as described.

5. In a grain-weighing machine, the chute ch, the projection pr, connected to the frame-work below, and valve v, hinged to the bottom of such chute and opening upward in the line of such projection, all combined substantially as described.

6. In an automatic grain weighing and measuring machine, a frame-work, a hopper having a hinged bottom suspended by a bail therefrom, a pressure-spring connected to such hopper for closing the hinged bottom when the load is discharged, an axle journaled in the frame-work, a driving-wheel mounted thereon, a tripping mechanism connected to such driving-wheel at one end and at the other with a trip which engages with a latch secured to the hinged bottom of such hopper, and a registering mechanism which is actuated by the opening of the hopper-bottom, all combined substantially as shown and described.

7. In an automatic grain-weighing machine, a frame-work, $f$, hopper $h$, having a hinged bottom, $bx$, bail $a$, the latter having bearings in such frame-work, driving-wheel $w'$, revolving in bearings upon such frame, and the trip-arm $ta$, connected to such driving-wheel at one end and at the other end to the trip $t$, pivoted at 7 to the cross-bar of the frame and adapted to engage with a latch, $l'$, which secures the hinged bottom in place, substantially as shown and described.

8. In an automatic grain weighing and measuring machine, the frame-work $f$, hopper $h$, suspended by a bail therefrom and provided with a hinged bottom, $bx$, closable by a pressure-spring, $sp$, registering mechanism comprising a pawl-lever, $pl$, pivoted to the hopper, pawl $p$, ratchet-wheel $sw$, gear-wheel $gw$, and indexes $ii$ upon such wheels, all secured to the side of the hopper, such registering mechanism actuated by the back-pressure of the hinged bottom of the hopper through the pin 3 upon the pawl-lever, all combined as shown and described.

9. In an automatic grain weighing and registering mechanism, a hopper, $h$, suspended by a bail, $a$, in frame-work $f$, a chute, $ch$, having a valve, $v$, connected to such hopper, a scale-beam, $b$, carrying a weight, $w$, and projection $pr$, connected to the frame for closing the valve in the chute, all combined and operating substantially as shown and described.

In witness whereof I have hereunto set my hand this 28th day of December, 1887.

WILLIAM S. SCOTT.

Witnesses:
C. P. JACOBS,
E. B. GRIFFITH.